United States Patent [19]

Udall

[11] 4,209,051
[45] Jun. 24, 1980

[54] TIRE HAVING BEADS WITH AIR RELIEF MEANS

[75] Inventor: William S. Udall, West Midlands, England

[73] Assignee: Dunlop Limited, London, England

[21] Appl. No.: 971,724

[22] Filed: Dec. 21, 1978

[30] Foreign Application Priority Data

Dec. 23, 1977 [GB] United Kingdom ............... 53822/77

[51] Int. Cl.² .......................... B60C 15/02; B60C 5/16
[52] U.S. Cl. .............................. 152/362 R; 152/379.1
[58] Field of Search ................ 152/362 R, 366, 379.1, 152/379.2 R, 379.2 D, DIG. 9, DIG. 17, 362 CS; 156/87

[56] References Cited

U.S. PATENT DOCUMENTS

4,148,348  4/1979  French et al. .................... 152/362 R

FOREIGN PATENT DOCUMENTS

2724996 12/1977 Fed. Rep. of Germany .
248086  3/1926 United Kingdom .
351803  7/1931 United Kingdom .
771348  3/1957 United Kingdom .

Primary Examiner—John T. Goolkasian
Assistant Examiner—L. E. Rodgers
Attorney, Agent, or Firm—Stevens, Davis, Miller & Mosher

[57] ABSTRACT

A pneumatic tire and a tire and wheel rim assembly are disclosed in which the tire has means preventing the tire remaining inflated when fitted to a non-matching wheel rim.

The tire has a pair of axially spaced tire beads at least one of which has a circumferentially extending toe projecting axially and radially inwards of the bead. The toe has primary air relief means extending between axially inner and outer surfaces of the toe to prevent the toe effecting a seal with the rim bead seat or hump when the tire is fitted to a non-matching wheel rim.

The tire bead having the toe may have secondary air relief means axially outboard of the primary air relief means to prevent the tire bead effecting a seal with the bead retaining flange when the tire is fitted to a non-matching wheel rim.

18 Claims, 6 Drawing Figures

TIRE HAVING BEADS WITH AIR RELIEF MEANS

This invention concerns improvements in or relating to tires and in particular to tubeless pneumatic tire of the type described in the assignees U.S. Pat. No. 4,148,348 issued Apr. 10, 1979.

In the above-mentioned patent there is described a tire in which one or both of the tire beads has an associated axially and radially inwardly projecting toe which locates in an associated groove in the wheel rim axially inboard of the associated rim bead seat. The tire bead retention of such a tire is thereby greatly improved even when the tire is deflated.

It is essential when fitting a tire to a wheel rim that the nominal tire bead diameter and the nominal wheel rim bead seat diameter are always correctly matched to ensure that the assembly is safe.

Up to now there has been standardization throughout the industry of an inch-based range of diameters for all rim and tire sizes from motorcycle to earthmover tires.

Recently, with the introduction of low aspect ratio tires, such as the assignees' run-flat tire marketed under the trade name 'Denovo', there has been a move towards increasing the wheel rim diameter for any given rolling radius of tires. This increase in wheel rim diameter allows the use of larger diameter brakes giving improved braking performance. However, the increased wheel rim diameters may have a metric diameter which falls between the above-mentioned inch-based diameters.

It has now been realized that a tire of the type described in our above-mentioned U.S. patent may be fitted to a wheel rim in which the nominal diameter of the rim bead seats is less than the nominal diameter of the tyre beads.

It will be appreciated that the diameter of each toe is less than the nominal diameter of the associated tire bead. Consequently where both tire beads have an associated toe, the toes may contact and effect a seal with the rim bead seats or humps of a wheel rim in which the nominal diameter of the rim bead seats is less than the nominal diameter of the tire beads but is substantially similar to the diameter of the toes.

In such an assembly the tire will remain inflated on the wheel rim and the non-matching of the tire and wheel rim will not be apparent to the tire fitter. However the assembly is unsafe and would present a serious safety hazard in use as the tire beads are not seated on the rim bead seats and the seal effected by each toe may fail at any time resulting in rapid deflation of the tire.

This problem is also encountered with tires in which one tire bead only has an associated toe. The toe may effect a seal with the adjacent rim bead seat as described above while the axially outer surface of the other tire bead may contact and effect a seal with the radially outwardly directed bead retaining flange of the other rim bead seat. The tire may therefore be fitted and will remain inflated even though the tire beads are not seated on the rim bead seats.

The present invention provides a pneumatic tire having a tread portion, a pair of sidewalls and a pair of axially spaced tire beads, each tire bead having an associated substantially inextensible reinforcement and at least one of the tire beads having a circumferentially extending toe made of elastomeric material, the toe extending axially and radially inwards of the tire bead and primary air relief means extending between the axially inner and outer surfaces of the toe.

The tire is intended to be fitted to a wheel rim having a pair of axially spaced rim bead seats of substantially the same nominal diameter as the tire beads and a circumferentially extending groove axially inboard of one of the rim bead seats in which the toe is received.

When the tire is fitted to a matching rim the toe is received in the groove and the air relief means is closed by the side portions of the groove. An air-tight seal is thereby provided, air cannot leak axially outwards beyond the toe and the tire remains inflated.

If the tire is fitted to a non-matching wheel rim, for example a rim in which the nominal diameter of the rim bead seats is less than the nominal diameter of the tire beads, the toe may contact the adjacent rim bead seat or hump without closing the air relief means. Consequently air can leak axially outwards beyond the toe and the tire will not remain inflated even if the other tire bead should seal against the bead retaining flange of the other rim bead seat.

The air relief means may comprise a plurality of holes extending through the toe and spaced uniformly around the circumference of the toe. More preferably the air relief means comprises a plurality of grooves extending across the radially innermost face or tip of the toe. The grooves may be separate and spaced uniformly around the circumference of the toe. In one preferred construction the grooves are in communication with one another, for example the grooves are arranged in crisscross fashion.

The holes or grooves may extend parallel to or at an angle relative to the main rotational axis of the tire.

The dimensions of the air relief means is selected so that the comparison resistance of the toe is not significantly reduced and the toe is capable of operating in the manner described in U.S. Pat. No. 4,148,348 when the tire is fitted to a matching wheel rim.

Although the provision of air relief means in the toe is usually sufficient to prevent the tire being inflated or remaining inflated when fitted to a non-matching wheel rim it is possible that under certain conditions the axially outer face of the tire bead associated with the toe may contact and effect a seal with the bead retaining flange of the adjacent rim bead seat. As a result air leaking through the relief means of the toe will not cause the tire to deflate and the non-matching of the tire and rim will not be apparent to the tire fitter.

In order to eliminate this possibility occurring it is preferred to provide secondary air relief means axially outwards of the toe to ensure air leaking through the air relief means of the toe will cause the tire to deflate.

The secondary air relief means may comprise a plurality of recesses formed in the axially outer face of the tire bead so that the tire bead cannot effect an air-tight seal with the bead retaining flange.

Each tire bead may have an associated toe. Each toe may have primary air relief means as described above although it will be appreciated that it is only necessary to provide primary air relief means in one of the toes. Secondary air relief means may be provided in each tire bead but will only usually be provided when the tire bead has an associated toe having primary air relief means.

A further aspect of the present invention provides a pneumatic tire and wheel rim assembly, the tire having a tread portion, a pair of sidewalls and a pair of axially spaced tire beads each tire bead having an associated substantially inextensible reinforcement and at least one of the tire beads having a circumferentially extending toe made of elastomeric material, the toe extending axially and radially inwards of the tire bead and primary air relief means extending between the axially inner and outer surfaces of the toe, the wheel rim having a pair of axially spaced rim bead seats each of which is arranged to receive a respective one of the tire beads and a circumferentially extending groove axially inboard of one of the rim bead seats and arranged to receive the toe whereby the primary air relief means is closed by the groove.

The invention will now be described in more detail, by way of example only, with reference to the accompanying drawings in which FIG. 1 is a section through a tire according to the present invention;

Figure 1:
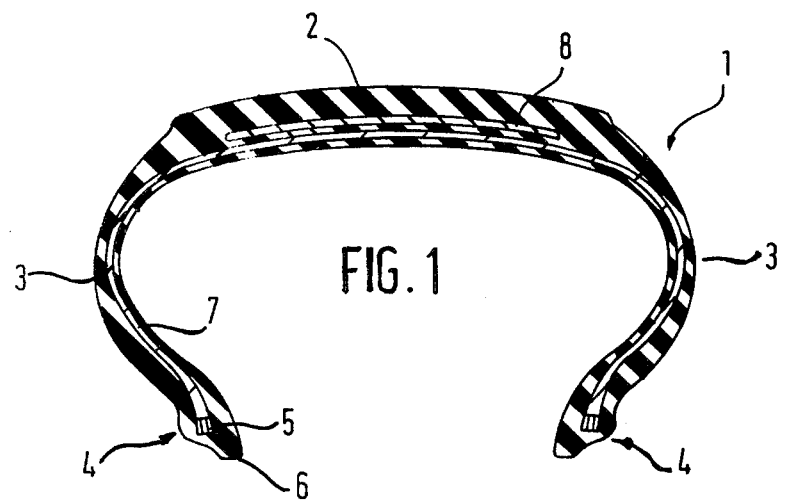
Figure 2:
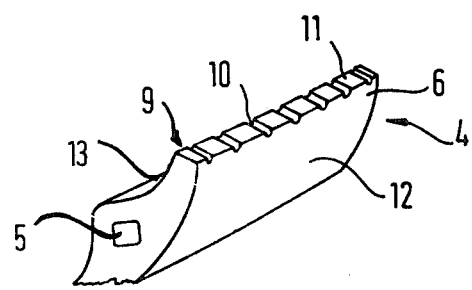
FIG. 2 is a perspective view of one of the tire beads of the tire shown in FIG. 1.

The tire 1 shown in FIGS. 1 and 2 of the accompanying drawings comprises a tread portion 2, a pair of sidewalls 3 and a pair of annular axially spaced tire beads 4. Each tire bead 4 is similar and comprises an annular substantially inextensible reinforcement 5 of generally rectangular cross-section and a toe 6. The toe 6 extends circumferentially around the bead and projects axially and radially inwards of the tire bead. A single fabric cord ply 7 extends circumferentially around the tire from one tire bead to the other tire bead. Tread reinforcements indicated generally by the reference numeral 8 are provided radially outwards of the ply 7 and reinforce the crown of the tire.

As best shown in FIG. 2 the toe 6 of each tire bead is provided with air relief means 9 comprising a plurality of grooves 10. The grooves 10 are moulded into the radially innermost face 11 or tip of the toe and extend between the axially inner and outer faces 12,13 respectively of the toe. The grooves 10 are uniformly spaced around the circumference of the toe and each groove extends in a direction parallel with the main axis of rotation of the tire. Each groove 10 has a depth of between 1 and 2 mm.

Figure 3:
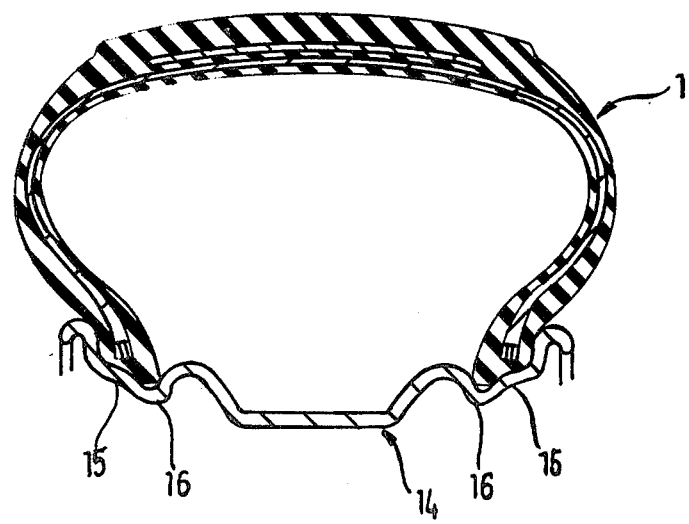
FIG. 3 is a section showing the tire of FIG. 1 fitted to a matching wheel rim.

As shown in FIG. 3 the tire 1 fits to a wheel rim 14 having a pair of axially spaced rim bead seats 15 and a pair of grooves 16. One groove 16 is located adjacent to and axially inboard of one rim bead seat 15 and the other groove 16 is located adjacent to and axially inboard of the other rim bead seat 15. Each toe 6 is received in a respective one of the grooves 16 and the axially inner and outer surfaces 12,13 (FIG. 2) of each toe seat against the sides of the associated groove 16. The air relief means 9 (FIG. 2) of each toe is thereby closed so that air within the tire cannot leak axially outwards beyond the toe and the tire remains inflated.

Figure 4:
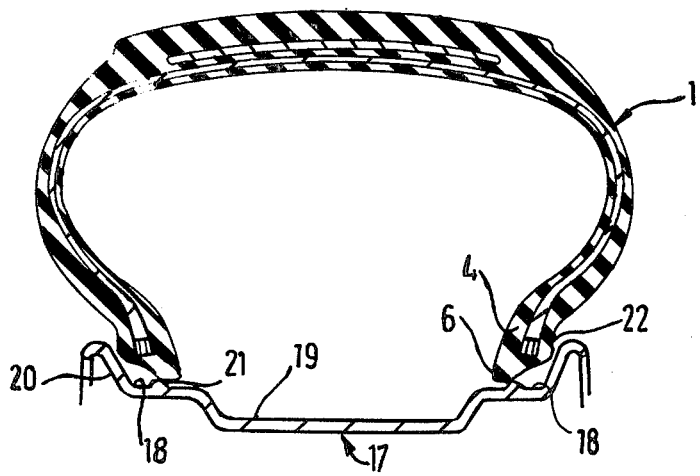
FIG. 4 is a section showing the tire of FIG. 1 fitted to the wrong wheel rim.

FIG. 4 shows the result of fitting the tire 1 shown in FIGS. 1 and 2 to a non-matching wheel rim 17. Each tire bead 4 has a nominal diameter of 370 mm while the diameter of the associated toe is 353.5 mm. The wheel rim 17 is a standard fourteen inch rim and has a pair of axially spaced rim bead seats 18 connected by a well 19. Each rim bead seat 18 is similar and extends between a radially outwardly directed bead retaining flange 20 and a hump 21. Each hump has a diameter of 354.7 mm i.e. 1.2 mm greater than the diameter of each toe 6. As a result when the tire 1 is fitted to the wheel rim 17 and rapidly inflated the radially innermost face 11 (FIG. 2) or tip of each toe 6 contacts the adjacent hump 21. However the air relief means 9 associated with each toe 6 prevents an air-tight seal being obtained between the toes 6 and humps 21. Air can therefore leak axially outwards beyond the toes causing the tire to deflate so that the non-matching of the tire and rim will be apparent to the tire fitter.

It will be appreciated that if air relief means 9 was not provided the toes could seal against the humps so that the tire would remain inflated even though the tire beads 4 were not seated on the rim bead seats 18. Such an assembly would be unsafe as the seal between the toes 6 and humps 21 may fail leading to rapid deflation of the tire.

Under certain conditions rapid inflation of the tire 1 may result in the axially outer surface 22 of each tire bead 4 contacting and effecting a seal with the adjacent bead retaining flange 20. Under these conditions air leaking through the air relief means 9 in each toe 6 would be prevented from escaping by the seal between the tire beads 4 and flanges 20. The tire would therefore remain inflated and the non-matching of the tire and rim would not be apparent to the tire fitter.

Figure 5:
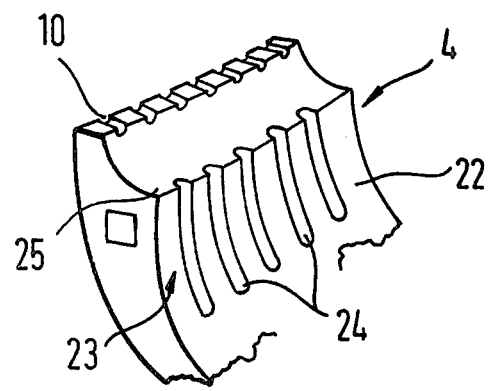
FIG. 5 is a perspective view showing a modification to the tire bead of FIG. 2.

FIG. 5 shows a modification to the tire bead 4 shown in FIG. 2 which overcomes this problem. The axially outer surface 22 of the tire bead 4 is provided with secondary air relief means 23 comprising a plurality of recesses 24. The recesses 24 extend radially outwards from the heel 25 of the tire bead 4 and are uniformly spaced around the circumference of the bead. The length of each recess is selected so that, if the tire is fitted to the wrong rim and on rapid inflation of the tire the outer surface 22 contacts the adjacent bead retaining flange 20, the recesses 24 prevent an air-tight seal being obtained. Air leaking through the primary air relief means 9 in the toes 6 is therefore able to leak through the secondary air relief means 23 and cause the tire to deflate.

Figure 6:
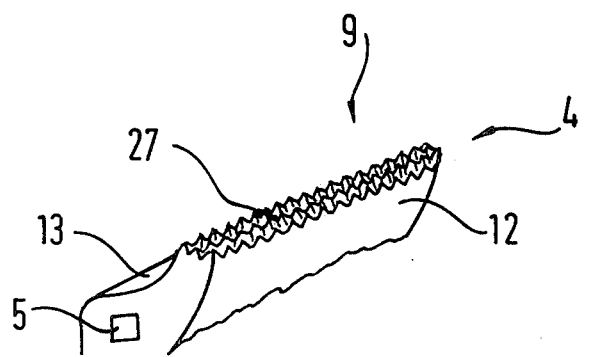
FIG. 6 is a perspective view of a tire bead similar to that shown in FIG. 2 but having different air relief means.

FIG. 6 shows a tire bead 4 similar to the tire bead shown in FIG. 2 except for a modification to the air relief means 9. In place of the separate, uniformly spaced grooves 10 the air relief means 9 comprises a plurality of grooves 27 which are arranged in criss-cross fashion relative to one another, i.e. the grooves are arranged at an angle to the main rotational axis of tire so that adjacent grooves are in communication with one another. Each groove has a nominal depth of 1/16 inch and extends between the axially inner and outer surfaces 12,13 of the toe. It will be readily appreciated that the grooves 27 will allow air to leak axially outwards of the toe when the tire is fitted to the wrong rim but will be sealed when the tire is fitted to a matching rim.

The invention is not restricted to the above described embodiments, for example the primary air relief means 9 may comprise holes extending through the toes or any other means of providing a pathway between the axially inner and outer faces of each toe and which is closed when the tire is fitted to a matching rim.

The air relief means 9 may be provided in one toe only and may comprise a single groove or hole. The secondary air relief means 23 where provided may be in one tire bead 4 only and may comprise a single recess or even a hole or holes extending through the tire bead 4.

Only one of the tire beads may have an associated toe and the primary and secondary air relief means are provided in that toe and tire bead respectively.

It will be appreciated that it is not an essential requirement for the primary air relief means and, where provided, the secondary air relief means to prevent the tire being inflated, only that they should cause the tire to deflate so that a non-matching of a tire and wheel rim will be apparent to the tire fitter.

Finally, the invention is applicable to any particular type of tire in which the tire bead or beads has/have an associated toe as described in the above-mentioned patent.

Having now described my invention, what I claim is:

1. A pneumatic tire and wheel rim assembly, said tire comprising a tread portion, a pair of sidewalls and a pair of axially spaced tire beads, each tire bead having an associated substantially inextensible reinforcement and at least one of said tire beads having a circumferentially extending toe made of elastomeric material, said toe extending axially and radially inwards of said tire bead and primary air relief means extending between axially inner and outer surfaces of said toe, said wheel rim having a pair of axially spaced rim bead seats each of which is arranged to receive a respective one of said tire beads and a circumferentially extending groove axially inboard of one of said rim bead seats and arranged to receive said toe whereby said primary air relief means is closed by said groove.

2. An assembly according to claim 1 wherein said tire bead having said toe has secondary air relief means axially outboard of said primary air relief means.

3. An assembly according to claim 1 wherein each tire bead has a toe and said rim has a pair of grooves each arranged to receive a respective one of said toes.

4. An assembly according to claim 3 wherein each toe has associated primary air relief means.

5. An assembly according to claim 4 wherein each tire bead has associated secondary air relief means axially outboard of said primary air relief means.

6. A pneumatic tire having a tread portion, a pair of sidewalls and a pair of axially spaced tire beads, each tire bead having an associated substantially inextensible reinforcement and at least one of said tire beads having a circumferentially extending toe made of elastomeric material, said toe extending axially and radially inwards of said tire bead and primary air relief means extending between axially inner and outer surfaces of said toe.

7. A pneumatic tire according to claim 6 wherein said primary air relief means comprises a groove formed in the radially innermost face or tip of said toe.

8. A pneumatic tire according to claim 7 wherein said primary air relief means comprises a plurality of grooves.

9. A pneumatic tire according to claim 8 wherein said grooves extend parallel with the main rotational axis of said tire, and are uniformly spaced in a circumferential direction.

10. A pneumatic tire according to claim 8 wherein said grooves extend at an angle to the main rotational axis of said tire.

11. A pneumatic tire according to claim 10 wherein said grooves are arranged in criss-cross fashion and adjacent grooves are in communication with one another.

12. A pneumatic tire according to claim 6 wherein said tire bead including said toe has secondary air relief means axially outboard of said primary air relief means.

13. A pneumatic tire according to claim 12 wherein said secondary air relief means comprises a recess in the axially outermost face of said tire bead.

14. A pneumatic tire according to claim 13 wherein said recess extends radially outwards from the heel of said tire bead.

15. A pneumatic tire according to claim 14 wherein said secondary air relief means comprises a plurality of recesses uniformly spaced in a circumferential direction.

16. A pneumatic tire according to claim 6 wherein each tire bead has an associated toe and one of said toes has primary air relief means.

17. A pneumatic tire according to claim 16 wherein both toes have associated primary air relief means.

18. A pneumatic tire according to claim 17 wherein both tire beads have associated secondary air relief means axially outboard of the primary air relief means.

* * * * *